Patented Nov. 9, 1943

2,333,764

UNITED STATES PATENT OFFICE 2,333,764

PROCESS OF FERMENTATION

Knut Burgeson, Bristol, Conn.

No Drawing. Application August 27, 1941,
Serial No. 408,527

4 Claims. (Cl. 99—90)

My invention relates to processes of fermentation.

It has among its objects to provide a new process of fermentation and, more particularly, an improved process for fermenting yeast for dough, including bread doughs and sweet and roll doughs. A further object of my invention is to provide such an improved process whereby, while the time required for the dough to get "life" is materially reduced, it is also made possible to produce dough which is smooth, while also producing a baked product of superior quality and color. Other objects and advantages of my improvements will, however, hereinafter more fully appear.

More particularly, for a batch of approximately 85 loaves of bread, I use the following ingredients: 24 ounces of common compressed yeast, 30 quarts of water, 105 lbs. of flour, 4½ ounces of sugar, and other usual ingredients, including such additional sugar as the recipe requires.

In carrying out my improved process, the yeast is first dissolved in 10 quarts of water, one-third the total amount of water to be used in the dough, preferably at about 80° F. To this mixture is added the sugar, at the rate of 3 ounces of sugar to the pound of yeast. Fermentation is thus started, the sugar acting on the yeast plant to cause so-called "budding" thereof with new cells grouping around central cells. This fermentation is allowed to continue for five minutes at 80° F., and somewhat longer and up to ten to fifteen minutes if the water is colder, and shorter if the water is warmer. Then, when the budding reaches the desired extent, the remaining two-thirds of the water, preferably at an ice-cold temperature, i. e. of 40 to 50° F., is poured into the fermented mixture. This sudden lowering of the temperature causes the yeast cells which have previously grouped together, to split immediately into single cells and thereby interrupt fermentation. Then, the resultant mixture is poured into the flour and other ingredients in the mixing machine and the latter started. After mixing for a usual time, the dough is ready to go to the bench and is divided. Then it goes into the heating chamber, usually set at 95° F., wherein it remains for from 12 to 15 minutes. Fermentation which was interrupted when the cold water was poured in, again begins, and the single cells immediately start to multiply again and form groups of cells in such manner as thereby further to increase the strength of the yeast. In this period of 12 to 15 minutes, the dough acquires the desired "life" and is ready to go to the molder to be formed into loaves.

As a result of my improved process, it is made possible to produce a better quality of baked product in substantially less time than heretofore. Further it is made possible to effect a substantial saving in yeast, the use of the cold water, as above described, making it possible to increase the useful fermentation effect obtained with a given quantity of yeast. Moreover, due to the interruption of fermentation as a result of a chilling effect, which continues sufficiently long to enable the dough to be mixed, divided and placed in the heating chamber before the yeast spoils by overfermentation, I also eliminate the expensive losses arising from overfermentation of the last of the batch. Attention is also directed to the fact that the doughs produced are easy to work, and such as to require no "punching" to remove the gas. Attention is also directed to the fact that with the breeding of the yeast germs as described, it is made possible for the quality of the yeast to be known before the dough is mixed; small bubbles and a smooth, i. e. uniform, surface of the yeast, sugar and water mixture indicating that the yeast is of good quality. These and other advantages of my improved process will, however, be apparent to those skilled in the art.

It will be understood that the time that the germs ferment in the dough either during budding or while in the heating chamber, may be varied, depending upon the temperature and the character of the bread and particularly the amount of sugar therein. For example, when making sweet or roll doughs, a longer rising period is necessary, a thirty minute rising period being usual with such doughs. It will also be understood that the proportion of water to sugar and yeast may also vary within limits, absolute precision as regards the water content being unnecessary and the latter depending upon the time which can be allowed for fermentation, and whether or not the dough must be used right away. However, the use of substantially one-third of the water ingredient with the yeast and sugar is preferred as this permits the dough to be left for a normal period without spoiling. Also, it will be understood that herein I consider as water, other ingredients containing a large percentage of water, such, for example, as milk and water mixtures.

While I have herein described certain forms in which my invention may be carried out, it will be understood that these have been chosen for purposes of illustration, and that the invention may be modified without departing from its spirit or the scope of the appended claims.

What I claim as new and desire to secure by Letters Patent is:

1. The steps in preparing yeast for dough which consist in, dissolving the yeast and sugar in substantially the proportion of three ounces of sugar to each pound of yeast, and in substantially one-third of the total water called for by the recipe, and after budding adding the remainder of the water while substantially ice cold to split the grouped yeast cells into single cells.

2. The steps in preparing yeast for dough which consist in, dissolving the yeast and sugar in substantially the proportion of three ounces of sugar to each pound of yeast, and in substantially one-third of the total water called for by the recipe and at a temperature of substantially 80° F., allowing the mixture to ferment for substantially five minutes, and then splitting the grouped yeast cells into single cells by adding the remaining two-thirds of the water with the latter at a temperature of from 40 to 50° F.

3. The steps in making dough which consist in, fermenting the yeast and sugar in a part of the liquid ingredient, after budding splitting the groups of cells by adding more of said ingredient at a sufficiently low temperature to effect such splitting and interrupt fermentation, and mixing the resulting mixture with the remainder of the ingredients while fermentation is interrupted.

4. The steps in making dough which consist in, fermenting the yeast and sugar in a part of the liquid ingredient, after budding splitting the groups of cells by adding more of said ingredient at a sufficiently low temperature to effect such splitting and interrupt fermentation, mixing the resulting mixture with the remainder of the ingredients, while fermentation is interrupted, and after dividing the dough, raising the temperature of the latter to cause the process of fermentation to be resumed.

KNUT BURGESON.